(12) United States Patent
Horiuchi et al.

(10) Patent No.: US 7,576,453 B2
(45) Date of Patent: Aug. 18, 2009

(54) STEEL WHEEL-TYPE LINEAR MOTOR

(75) Inventors: Kiyoshi Horiuchi, Tokyo (JP); Tomio Koura, Tokyo (JP); Toshinori Nakagawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 387 days.

(21) Appl. No.: 10/594,622

(22) PCT Filed: Mar. 15, 2005

(86) PCT No.: PCT/JP2005/004505

§ 371 (c)(1),
(2), (4) Date: Sep. 28, 2006

(87) PCT Pub. No.: WO2006/097998

PCT Pub. Date: Sep. 21, 2006

(65) Prior Publication Data

US 2007/0194631 A1    Aug. 23, 2007

(51) Int. Cl.
*H02K 41/02* (2006.01)
*H02K 3/46* (2006.01)
*B60L 13/03* (2006.01)

(52) U.S. Cl. .................. 310/12; 104/294; 104/290; 104/292

(58) Field of Classification Search .............. 310/12, 310/270; 104/288, 289, 290, 292, 294
See application file for complete search history.

(56) References Cited

U.S. PATENT DOCUMENTS 5,258,671 A * 11/1993 Vollenwyder et al. ........ 310/12

FOREIGN PATENT DOCUMENTS

| JP | 53-52320 | * | 5/1978 |
| JP | 54-126903 | * | 10/1979 |
| JP | 54-150612 A | | 11/1979 |
| JP | 63-048152 | * | 2/1988 |

(Continued)

OTHER PUBLICATIONS

International Search Report dated Jun. 21, 2005.

(Continued)

*Primary Examiner*—Burton Mullins
(74) *Attorney, Agent, or Firm*—Buchanan Ingersoll & Rooney PC

(57) ABSTRACT

The invention provides a steel wheel-type linear motor in which a protective cover 11 having insulating properties and coming in direct contact with a stator coil 9 is located on the ground side of the stator coil 9 protruding from a stator core 7; a vent hole 11*a* is formed in the protective cover 11 to be opposite to a gap formed between ends of the stator coil 9 protruding from the stator core 7; and a bar 10 protrudes from the stator core 7 and thus the protective cover 11 on the stator core 7 side is pressed onto the stator coil 9 to be supported by the bar 10, the protective cover 11 on the side opposite to the stator core 7 is fixed to the stator coil 9 by a fastener member 12 having insulating properties that goes through the vent holes 11*a*, and the stator coil 9 and the protective cover 11 are formed to be of integral structure using an insulating varnish.

2 Claims, 4 Drawing Sheets

FOREIGN PATENT DOCUMENTS

| | | | |
|---|---|---|---|
| JP | 63-220761 | * | 9/1988 |
| JP | 63213464 A | | 9/1988 |
| JP | 63220761 A | | 9/1988 |
| JP | 2-184204 A | | 7/1990 |
| JP | 3-195306 A | | 8/1991 |
| JP | 10-117473 A | | 5/1998 |

OTHER PUBLICATIONS

Chinese Office Action, with English-Language Translation, dated Mar. 27, 2009.

* cited by examiner

[Fig. 1]
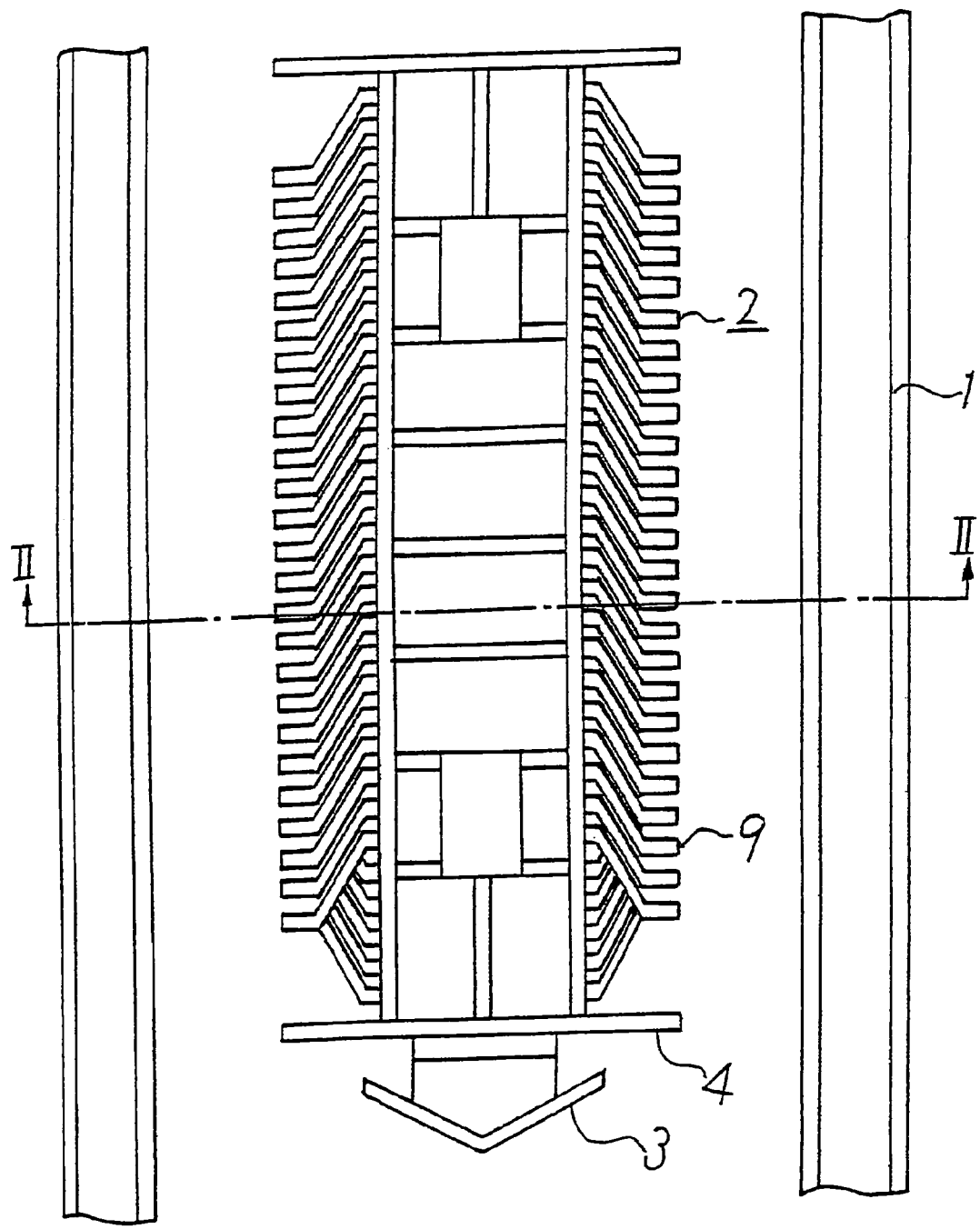

[Fig. 2]
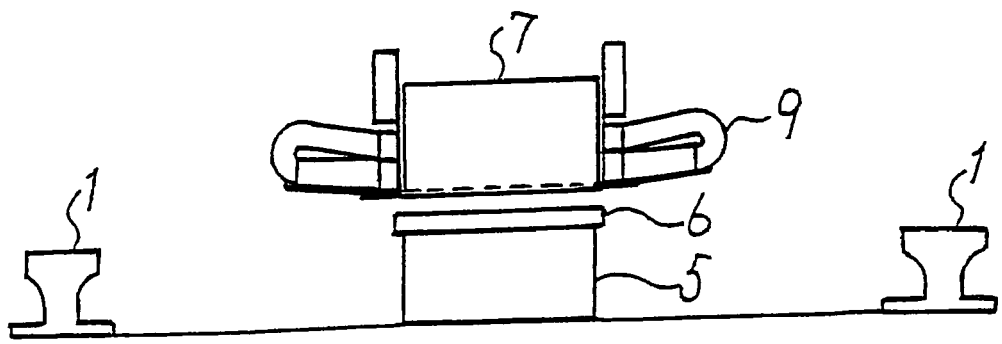
[Fig. 3]
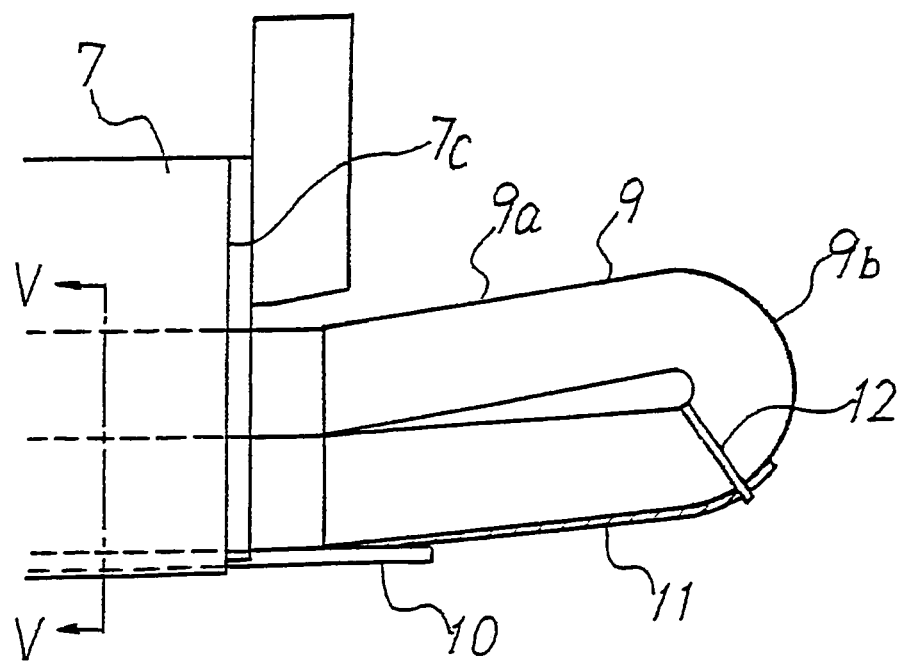

[Fig. 4]
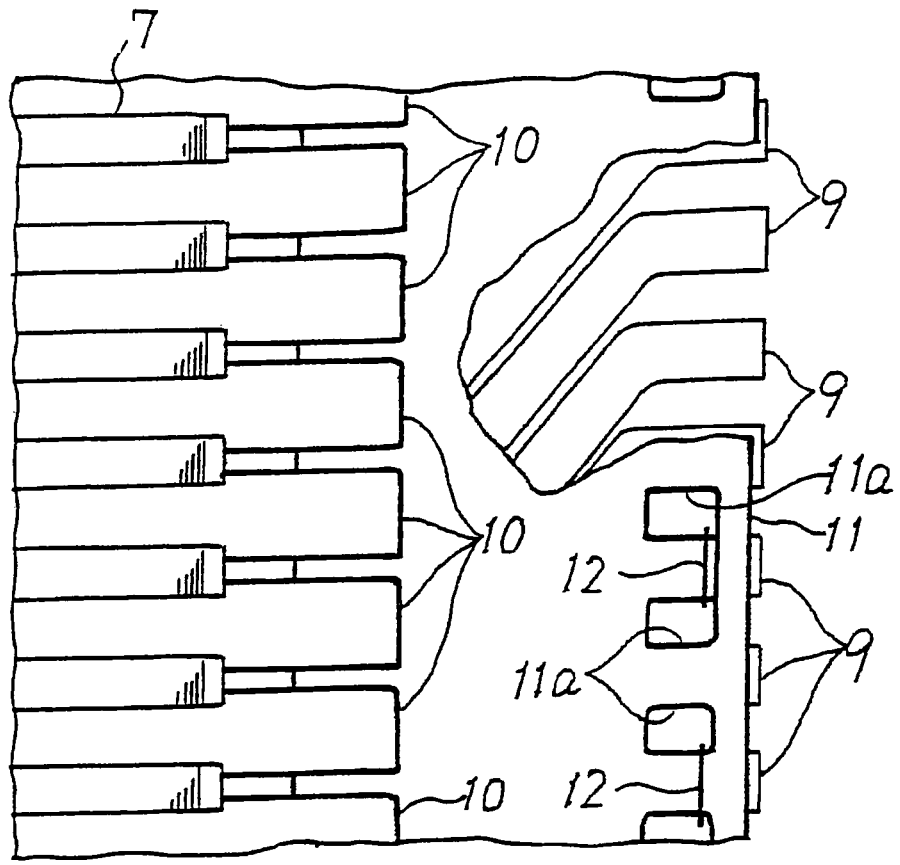
[Fig. 5]
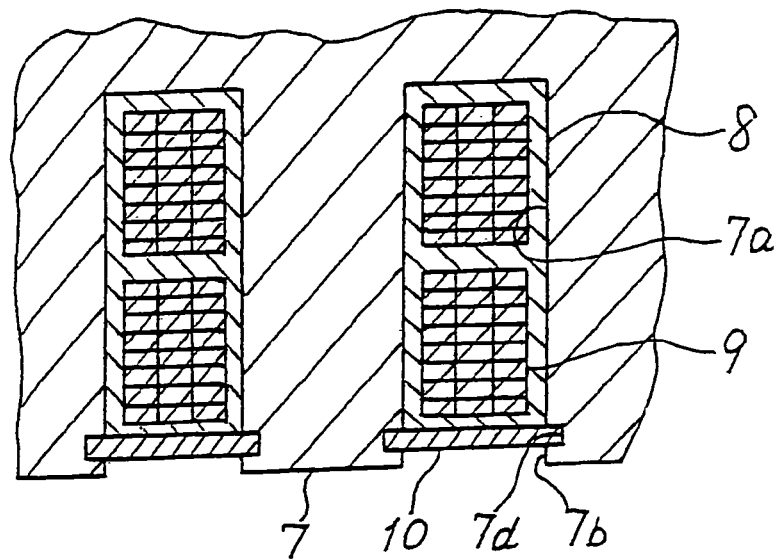

[Fig. 6]
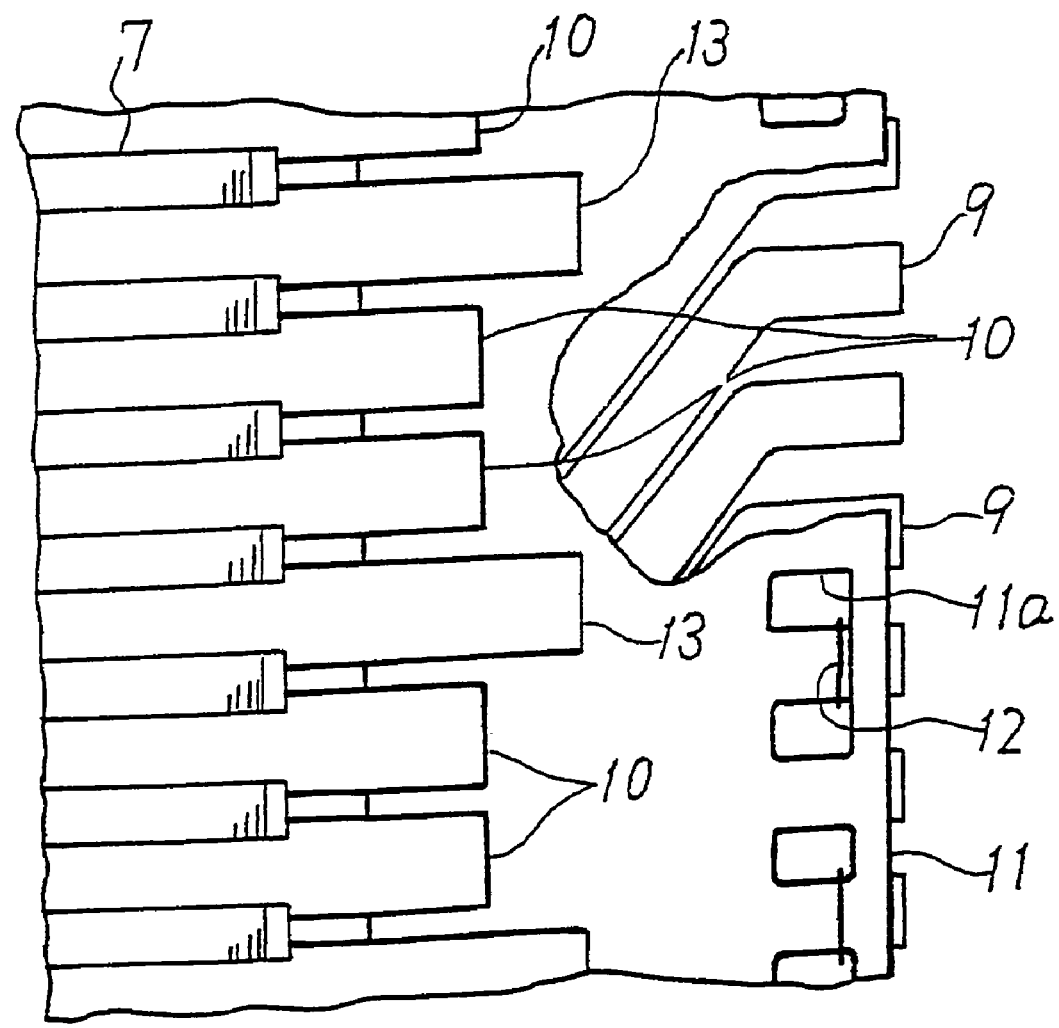

STEEL WHEEL-TYPE LINEAR MOTOR

TECHNICAL FIELD

The present invention relates to a steel wheel-type linear motor in which a stator coil is provided with a protective cover.

BACKGROUND ART

In conventional steel wheel-type linear motors, bars that causes a stator coil to be fixed to a stator core extend from the end of the stator core toward the end of the stator coil to protect the ends of the stator coils protruded from the stator core.

To prevent the flexure of bars, an insulating material is interposed partially between the bars protruded from the stator core and the stator coil, and the bars are fixed to the ends of the stator coils with an insulating tape.

The bars constructed as describe above prevents a stator coil from being damaged with obstacles having been hit up from the ground (refer to, for example, Patent Document 1).

[Patent Document 1] Japanese Patent Publication (unexamined) No. 117473/1998 (Page 3, FIG. 3)

DISCLOSURE OF INVENTION

According to the conventional steel wheel-type linear motor disclosed in Patent Document 1, an insulating material is interposed partially between the bars and the stator coils, and the bars are fixed to the stator coils with an insulating tape. Accordingly, a problem exists in that there remains troublesome maintenance work of removing dirt accumulated between the bars and the stator coils except for a part where an insulating material is interposed.

The present invention was made to solve problems as described above, and has an object of providing a steel wheel-type linear motor with which it is possible to protect a stator coil, as well as to achieve more easy maintenance work.

The steel wheel-type linear motor according to the invention is a steel wheel-type linear motor in which a stator coil acting as a primary conductor of a linear motor is located onto a bogie that supports a steel wheel capable of traveling on a rail so as to be opposite to a secondary conductor on the ground side; the stator coil is contained in a coil groove of a stator core including an opening so as to protrude from an end of the stator core; and a bar is fitted by insertion in the opening, and thus the stator coil is fixed to the stator core. The steel wheel-type linear motor comprises: a protective cover having insulating properties that is located in direct contact on the ground side of the stator coil protruded from the stator core; and a vent hole formed in the protective cover in opposition to a gap formed between adjacent ends of the stator coil protruded from the stator core.

In this steel wheel-type linear motor, the bar is made to protrude from the stator core, and thus the protective cover on the stator core side is pressed onto the stator coil to be supported by means of the bar; the protective cover on the side opposite to the stator core is fixed to the stator coil by means of a fastener member having insulating properties that goes through the vent holes; and the stator coil and the protective cover are formed to be of integral structure using an insulating varnish.

According to the invention, a protective cover is brought in direct contact with the ground side of a stator coil protruded from the stator core to support the protective cover on the stator core side with bars; as well as the protective cover on the side opposite to the stator core is fixed by means of a fastener member to be integrally structured using an insulating varnish, whereby a rigid protective cover can be formed. As a result, it is possible to prevent the stator coil from being damaged by obstacles being hit up with the use of the protective cover.

Furthermore, due to the fact that the protective cover is brought in direct contact with the stator coil to be integrally structured using an insulating varnish, it is possible to carry-out more easy maintenance work such as removal of dirt.

BRIEF DESCRIPTION OF DRAWINGS

FIG. 1 is a plan view showing a construction of a steel wheel-type linear motor according to a first preferred embodiment for carrying out the present invention.

FIG. 2 is a cross sectional view taken along the line II-II of FIG. 1.

FIG. 3 is a cross sectional view showing a main part of FIG. 2.

FIG. 4 is a bottom view of FIG. 3.

FIG. 5 is a cross sectional view taken along the line V-V of FIG. 3.

FIG. 6 is a bottom view showing another example according to the first embodiment.

BEST MODE FOR CARRYING OUT THE INVENTION

Embodiment 1

FIG. 1 is a plan view showing a construction of a steel wheel-type linear motor according to a first preferred embodiment of the invention, being a view of a head portion taken from above. FIG. 2 is a cross sectional view taken along line II-II of FIG. 1, FIG. 3 is a cross sectional view showing a main part of FIG. 2, FIG. 4 is a bottom view of FIG. 3, and FIG. 5 is a cross sectional view taken along line V-V of FIG. 3.

In FIGS. 1 to 5, a bogie (not shown) supporting steel wheels is located in a traveling manner on rails 1 laid on the ground.

Further, a linear motor 2 is mounted on this bogie.

With referenced to FIGS. 1 to 5, the construction of a steel wheel-type linear motor according to this first embodiment is described.

An obstruction guard 3 and an obstruction guard 4 are provided on the head side of the linear motor 2 in order to protect the later-described stator coil 9 from obstacles.

Moreover, a secondary conductor 6 of the linear motor 2 is disposed via a support base 5 at the central portion between the rails 1.

A stator core 7 acting as a primary conductor of the linear motor 2 is mounted on the bogie (not shown) so as to be opposite to the secondary conductor 6 with a predetermined space.

In addition, the linear motor 2 is mainly constructed of the secondary conductor 6 disposed on the groundside, and the stator core 7 and below-described stator coil 9 acting as the primary conductor.

A coil groove 7a of the stator core 7 is formed so that an opening 7b is opposed to the secondary conductor 6.

Furthermore, a stator coil 9 that is insulated with an insulating material 8 is contained in the coil groove 7a, and an end portion 9a of the stator coil 9 is constructed so as to protrude from an end 7c of the stator core 7.

Additionally, there are formed gaps such that adjacent ends 9b of the stator coil 9 are at predetermined intervals with each other.

The stator coil 9 is fixed to the stator core 7 by means of a bar 10 that is fitted by insertion in a bar groove 7d formed in the opening 7b of the stator core 7.

In addition, the bars 10 are constructed so as to extend from the end 7c of the stator core 7 toward the ends 9b of the stator coils 9 only by a predetermined length.

On the ground-side of the end portions 9a of the stator coils 9 protruding from the stator core 7, there is disposed a protective cover 11 of, for example, polyamide sheet having insulating properties in direct contact with the stator coil 9.

A vent hole 11a is formed in the protective cover 11 so as to be opposed to the gap that is formed between the adjacent ends 9b of the stator coil 9.

Further, the protective cover 11 on the stator core 7 side is pressed onto the stator coil 9 with the bar 10 extending from the stator core 7 to be supported.

Furthermore, the protective cover 11 on the side opposite to the stator core 7 (that is, the protective cover 11 on the side of the ends 9b of the stator coils 9) is fixed to the ends 9b of the stator coils 9 by means of a fastener member 12 of string type that goes through the adjacent vent holes 11a.

In addition, the fastener member 12 has insulating properties.

Furthermore, the stator coil 9 and the protective cover 11 are structured integrally using an insulating varnish.

A polyamide sheet possessing flexibility is treated with an insulating varnish to be cured, thereby coming to be rigid. Accordingly, in the case where a protective cover 11 that is made of a polyamide sheet is fixed to the stator coil 9 with the fastener member 12, it is possible to maintain a sufficient strength without fixing the protective cover 11 with the fastener members 12 to each of the vent hole 11a.

In the steel wheel-type linear motor of such a construction, the protective cover 11 is brought in direct contact with the ground side of the stator coil 9 protruding from the stator core 7, and thus the protective cover 11 on the stator cores 7 side is supported with the bars 10, as well as the protective cover 11 on the side opposite to the stator core 7 (that is, on the side of the ends 9b of the stator coils 9) is fixed by means of the fastener members 12 to be integrally structured using an insulating varnish, so that the rigid protective cover 11 will be formed.

Accordingly, it is possible to prevent a stator coil 9 from being damaged with obstacles being hit up with the use of this protective cover 11.

Furthermore, the protective cover 11 is brought in direct contact with a stator coil 9 to be integrally structured using an insulating varnish, whereby it is possible to achieve more easy maintenance work such as removal of dirt.

As described above, the steel wheel-type linear motor according to the first embodiment is a steel wheel-type linear motor in which a stator coil 9 acting as a primary conductor of a linear motor 2 is located onto a bogie that supports a steel wheel capable of traveling on a rail so as to be opposite to a secondary conductor 6 on the ground side; the stator coil 9 is contained in a coil groove 7a of a stator core 7 including an opening 7b so as to protrude from an end of 7c of the stator core 7; and a bar 10 is fitted by insertion in the opening 7b, and thus the stator coil 9 is fixed to the stator core 7; the steel wheel-type linear motor comprising:

a protective cover 11 having insulating properties that is located in direct contact on the ground side of the stator coil 9 protruded from the stator core 7; and a vent hole 11a formed in the protective cover 11 in opposition to a gap formed between adjacent ends 9b of the stator coil 9 protruded from the stator core 7;

in which the bar 10 is made to protrude from the stator core 7, and thus the protective cover 11 on the stator core 7 side is pressed onto the stator coil 9 to be supported by means of the bar 10; the protective cover 11 on the side opposite to the stator core 7 is fixed to the stator coil 9 by means of a fastener member 12 having insulating properties that goes through the vent holes 11a; and the stator coil 9 and the protective cover 11 are formed to be of integral structure using an insulating varnish.

As a result, it comes to be possible to form a rigid protective cover 11, thus enabling to prevent a stator coil 9 from being damaged with obstacles being hit up with the use of this protective cover 11. Furthermore, a protective cover 11 is brought in direct contact with a stator coil 9 to be integrally structured using an insulating varnish, thereby enabling to achieve more easy maintenance work such as removal of dirt.

FIG. 6 is a bottom view showing another example of the first embodiment. According to the first embodiment described above, as shown in FIG. 4, plural numbers of bars 10 protrude from the end 7c of the stator core 7 by the same length.

As shown in FIG. 6, however, it is preferable that bars 13 extending up to the vent holes 11a are provided on the side of the ends 9b of the stator coil 9 at intervals of a predetermined number of bars.

As a result, it is possible to prevent more reliably the protective cover 11 from being separated from the stator coil 9.

Furthermore, according to the first embodiment described above, the vent holes 11a are formed in the protective cover 11 so as to be opposed to the gaps formed between the ends 9b of the stator coil 9. However, by forming through holes (not shown) that go through the protective cover 11 between the ends of each bar 10, 13 and the vent holes 11a, it is possible to improve the cooling effect of a stator coil 9.

INDUSTRIAL APPLICABILITY

The present invention is of great use in putting a steel wheel-type linear motor into practice with which it is possible to protect a stator coil from being damaged with obstacles being hit up, as well as to achieve more easy maintenance work such as removal of dirt.

The invention claimed is:

1. A steel wheel-type linear motor in which a stator coil acting as a primary conductor of a linear motor is located on a bogie that supports a steel wheel capable of traveling on a rail so as to be opposite to a secondary conductor on the ground side; said stator coil is contained in a coil groove of a stator core including an opening so as to protrude from an end of said stator core; and a bar is fitted by insertion in said opening, and thus said stator coil is fixed to said stator core, the steel wheel-type linear motor comprising:

a protective cover having insulating properties that is located in direct contact on the ground side of said stator coil protruded from said stator core; and a vent hole formed in said protective cover in opposition to a gap formed between adjacent ends of said stator coil protruding from said stator core; wherein:

said bar is made to protrude from said stator core, and said protective cover on said stator core side is pressed onto said stator coil to be supported by means of said bar; said protective cover on the side opposite to said stator core is fixed to said stator coil by means of a fastener member having insulating properties that goes through said vent holes; and said stator coil and said protective cover are formed into an integral structure by means of an insulating varnish.

2. The steel wheel-type linear motor according to claim 1, wherein said bars extend up to said vent hole on the end side of said stator coil at intervals of a predetermined number of bars.

* * * * *